Feb. 25, 1964   W. E. WILLIAMS   3,122,601
INTERFEROMETER
Filed Dec. 5, 1960   5 Sheets-Sheet 1

INVENTOR.
WILLIAM EWART WILLIAMS
BY
ATTORNEYS.

Feb. 25, 1964 W. E. WILLIAMS 3,122,601
INTERFEROMETER
Filed Dec. 5, 1960 5 Sheets-Sheet 2

INVENTOR.
WILLIAM EWART WILLIAMS
BY
Christie, Parker & Hale
ATTORNEYS.

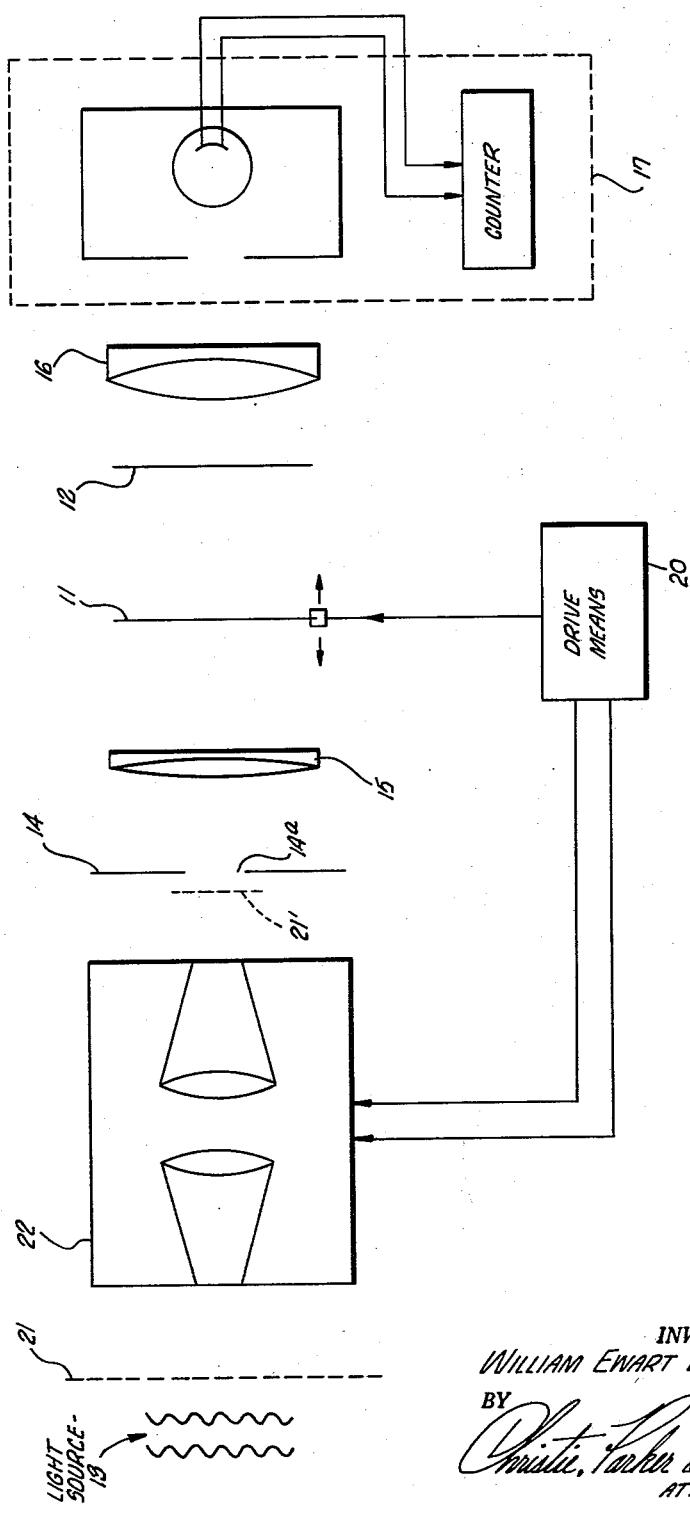

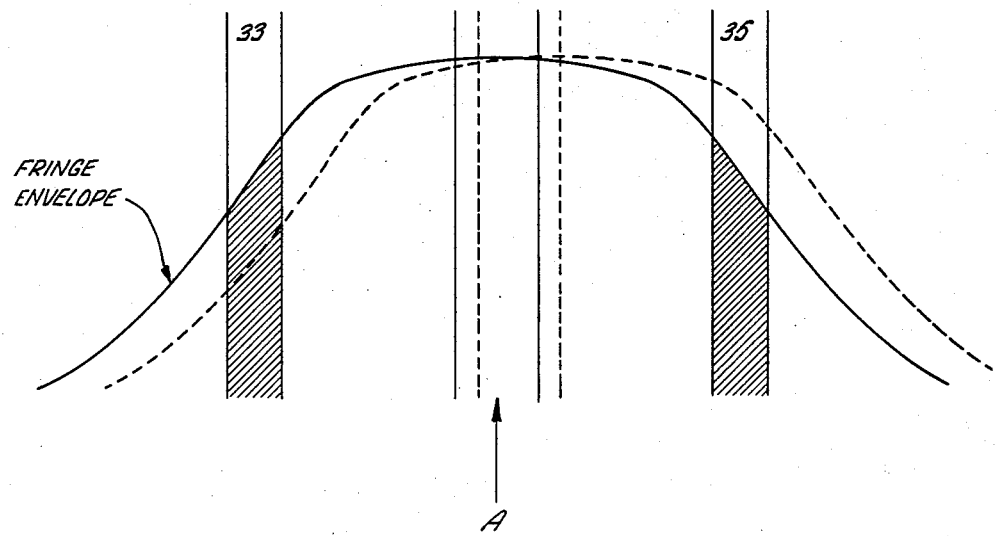
FIG_9_
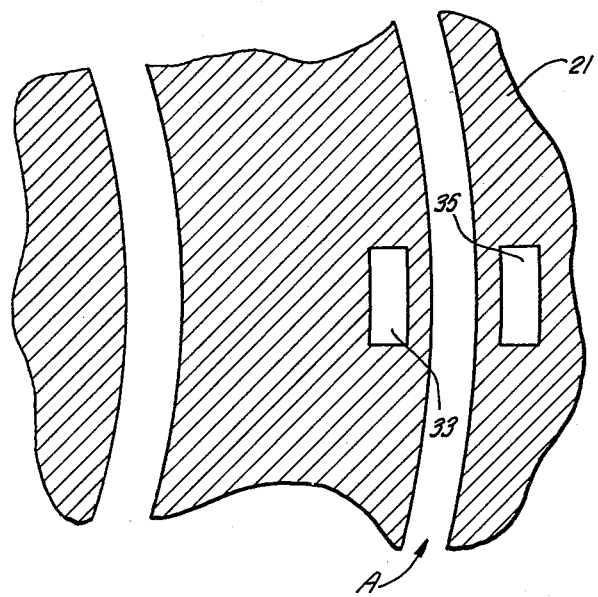
FIG_6_

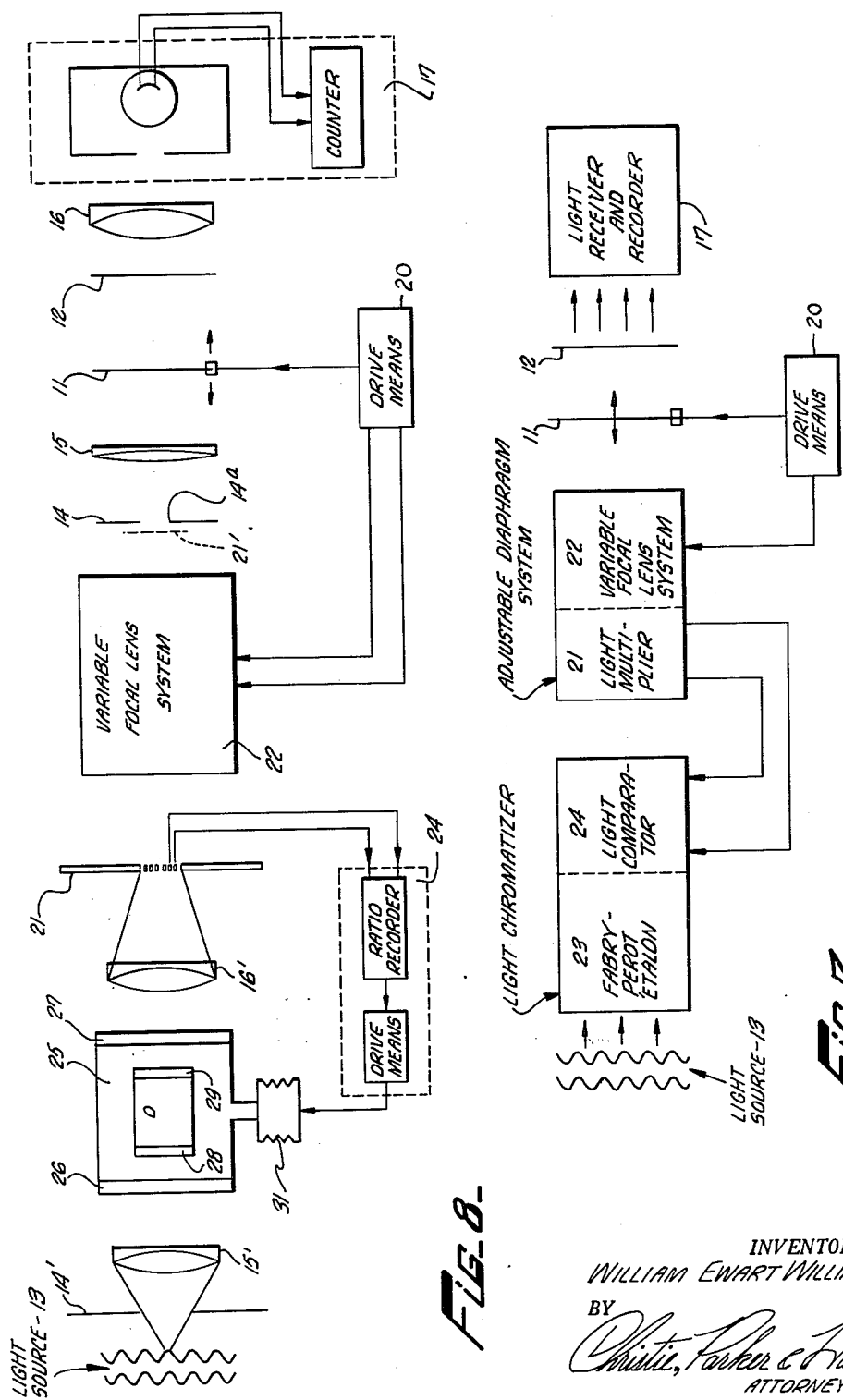

United States Patent Office 3,122,601
Patented Feb. 25, 1964

3,122,601
INTERFEROMETER
William Ewart Williams, 155 S. Orange Grove Ave.,
Apt. 1, Pasadena, Calif.
Filed Dec. 5, 1960, Ser. No. 73,655
12 Claims. (Cl. 88—14)

This invention relates to optical apparatus based on the interference of light beams and, more particularly, to an improved optical interferometer functioning on the division of amplitude of a light beam for measuring large path differences.

It is well known that as the optical path difference between the two beams of either a Michelson or Twyman and Green type interferometer increases, the fringes become more and more blurred, until finally no trace of an interference fringe effect can be observed by the human eye or discriminated by means of a photoelectric cell. As the light source becomes more and more monochromatic, the path difference at which the fringes vanish becomes correspondingly greater. However, with increased monochromaticity, there is naturally a reduction in the absolute total light flux of the fringes so that a long exposure is needed to photograph the fringes or an extremely slow counting rate must be used when employing a photoelectric counting system. The rate of counting with a photoelectric system is further reduced due to the geometry of the interferometer system.

Any practical interferometer system for measuring large path differences must not only produce the interference patterns at such a light level to allow the interference rings to be discriminated by photoelectric techniques but also the visibility or degree of clearness of the interference pattern is dependent on the degree of monochromaticity of the light source.

Due to Doppler and Stark effects, et cetera, all spectral lines have very real widths. Atomic beams, emitting radiation, give extremely narrow spectral lines when viewed at right angles to the direction of motion. Unfortunately, the energy available is far too low to be used in any practical fringe counting system. This is due in part to the fact that only a very narrow cone of radiation can be utilized, otherwise an appreciable component of the Doppler effect of the radiating particle (now not exactly at ninety degrees) will be included and the effective spectral line correspondingly widened.

An artificially monochromatized source for long path interferometry has been achieved by Gardiner (Journal of the Optical Society of America for February 1960) by using a small pinhole aperture at the common center of curvature of concentric spherical Fabry-Pérot plates as the effective source for a two beam interferometer. The fringes are, however, faint and require several minutes' exposure to photograph them. The light level is far too low for it to be used with a fringe counting device.

A more serious difficulty is that the wave length of the centroid of the narrow transmitted band depends on the optical path of the spherical surfaced étalon, and this, in turn, is governed by the geometrical spacing and the refractive index of the air or gas between the plates. Either or both of these factors are subject to change, so the effective wave length supplied to the measuring interferometer will correspondingly alter.

The present invention provides an improved interferometer incorporating an arrangement for substantially increasing the total amount of light flux available for counting the fringes at a high rate without increasing the brightness or area of the source. In addition, it affords a means of monochromatizing the effective source still further and yet maintain stability of the effective wave length so that fringes, counted over a large path difference, have reference to a known, fixed wave length.

Broadly, the interferometer includes an adjustable diaphragm system arranged intermediate the light source and the conventional light dividing element for increasing the total amount of light focused on the light dividing element. The adjustable diaphragm system provides a means for monochromatizing the light and may be used in combination with means for sensing a portion of the light rays transmitted to said light dividing element to control the fraction of the light that is to be transmitted through the adjustable diaphragm system and thereby control the absolute wave length thereof.

More specifically, the present interferometer utilizes an adjustable diaphragm system that comprises a plate that has a preselected ring pattern recorded thereon in terms of opaque and light transmitting portions. The plate consists of a central transparent disc surrounded by spaced transparent rings. The light transmitting portions are defined to transmit a preselected portion of the light energy from the light source and which diaphragm is utilized in combination with a variable focal length system that is controlled to provide images of the ring system of various sizes at the focal plane of the interferometer objective lens. The size of the images are controlled to be inversely proportional to the square root of the path differences between the reflecting elements of the measuring interferometer proper. The variable focal length system is coupled to be driven by the means for moving the movable reflecting element and thereby is continuously varied in accordance with the changes in the differences in the path lengths between the reflecting elements. To control the effective wave length of the light energy transmitted by the transmitting portions of the plate, the plate is further arranged with light transmitting apertures adjacent a light transmitting ring and utilized in combination with a light comparator to maintain the portion of the light transmitted by the transparent rings the same preselected fraction of the light source. This control is effected by utilizing the electrical signal from the light comparator to control the pressure of a gas in a chamber that encloses a Fabry-Pérot étalon and thereby the optical path therein. The Fabry-Pérot étalon and its chamber are arranged intermediate the light source and the adjustable diaphragm system.

These and other features of the present invention may be more fully appreciated when considered in the light of the following specification and drawings, in which:

FIG. 5 is an equivalent diagram of an interferometer embodying the invention;

FIG. 6 is a diagrammatic representation of a fragmentary portion of the diaphragm of FIG. 4;

FIG. 7 is a block diagram of a modified interferometer embodying the invention;

FIG. 8 is a diagrammatic representation of the interferometer system of FIG. 7; and FIG. 9 is a diagrammatic representation of a fringe envelope as produced in the invention showing the light transmitting apertures superimposed thereon.

Figure 1:
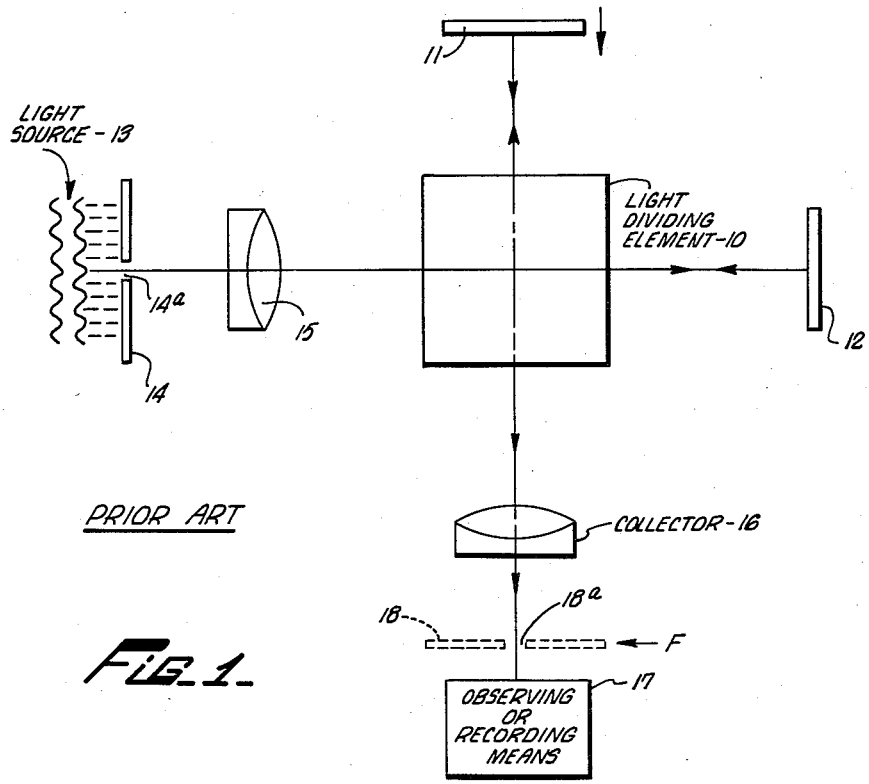
FIG. 1 is a diagrammatic representation of a prior art interferometer system.

Now referring to FIG. 1, the structure for a conventional interferometer operating on the principle of the division of the amplitude of a light beam will be briefly considered. This conventional interferometer may take the form of any of the well-known interferometers comonly referred to as the Michelson or Twyman and Green variation thereof for the purposes of this invention. In all of these interferometers the basic elements include a light dividing element 10 constructed of a material that is partially reflecting and partially transmitting to divide the pair of beams that are most usually oriented at about ninety degrees to each other although this is by no means necessary. There is usually provided a pair of light reflecting elements 11 and 12 spaced about the light dividing element 10 to receive the rays transmitted therefrom and to reflect them back on to their path to the light dividing element 10 where they are once again recombined and passed out of the dividing element proper towards some observing or recording means 17.

In the Twyman-Green type of interferometer a point source of light 13 is utilized with a diaphragm 14 arranged at the focal point of a collimator lens 15 to direct a parallel beam into the light divider 10. The diaphragm 14 is provided with a centrally arranged small aperture 14$^a$. The recombined wave fronts emerge from the light dividing element 10 and are collected by means of a collector lens 16 which, in turn, focuses them on to some recording or observing means, diagrammatically represented by a box identified by the reference character 17. The light flux observed or recorded at element 17 is dependent upon the path difference, if any, of the light rays as they traverse their paths between the element 10 and their corresponding reflecting elements 11 and 12. If the path lengths are identical, the beams, upon recombination, will constructively interfere to produce maximum light flux, while, if the path lengths differ by one-half of a wave length with respect to the light from the source 13, the pair of beams will destructively interfere whereby minimum light flux will be produced. These differences in path lengths may be measured in terms of the wave length of the source 13 as indicated by conventional straight line fringes comprising the alternate bright and dark images that are produced and thereby accurately mesure these path differences. In order to obtain these straight line fringes, one of the reflecting elements 11 or 12 must be tilted.

This general structure and operation has been discussed in terms of the Twyman-Green type of interferometer, and the Michelson variation thereof is essentially the same type of structure with the exception that an extended source 13 is used rather than a point source and the diaphragm 14 is not necessary in the Michelson type of device but is replaced by a diaphragm 18 positioned at the focal plane of the collector 16. However, since the diaphragm 18 is essentially the image of the diaphragm 14, the two interferometers are seen to be equivalent. A more detailed discussion of these basic interferometers is covered in a text by John Strong entitled "Concepts of Classical Optics," published by W. H. Freeman and Company, Incorporated, of San Francisco, in 1958.

Figure 2:
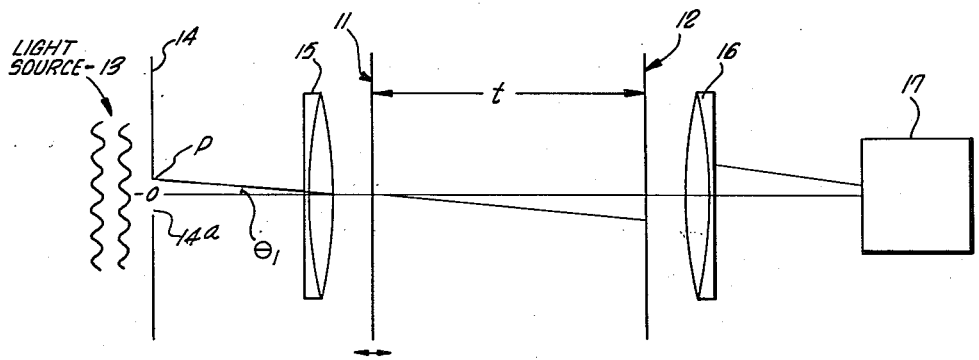
FIG. 2 is an equivalent diagram of the interferometer system of FIG. 1.

The interferometer structure as discussed hereinabove may be diagrammatically represented by means of an equivalent schematic representation thereof, as shown in FIG. 2. It will be noted that in this arrangement the equivalent diagram for a Twyman-Green type of interferometer is shown and the light dividing element 10 is omitted. Furthermore, the pair of light reflecting elements 11 and 12 are shown spaced apart a distance corresponding to the differences in their path lengths and which path difference is further identified as $t$. The reflecting element 11 is considered to be the movable element of the pair of reflecting elements.

With this schematic diagram in mind, the limitations on the use of prior art interferometers for measuring purposes will now be examined. With this type of instrument, the light source 13 must be a point source and which source is obtained by the use of diaphragm 14, as shown. The physical distance or optical path difference between the elements 11 and 12 is represented by $t$ in a space or refractive index $\mu$, then, with respect to the light beams from the source 13 originating at a radial point O, the path difference will be twice the path difference $t$, since the light beam traverses the path from the light dividing element 10 to the respective light reflectors 11 twice, or $2\mu t$. The two divided beams will reinforce if the path difference $2\mu t$ equals a wave length ($\lambda$) or a multiple thereof of the light from source 13 and thereby, will produce a disc of maximum intensity or flux of light at the focal plane of collector lens 16. This relationship can also be expressed as $2\mu t = M$, wherein M is an integer. Assuming further that the light beams originating from a point $p$ subtends an angle $\theta_1$ at the nodal point of the collimator lens 15, as shown in FIG. 2. The light beams from the point $p$ will have a path difference of $$\frac{2\mu t \text{ cosine } \theta}{\lambda}$$

and which latter expression can be reduced to $M$ cosine $\theta$. If $M$ cosine $\theta$ is less by half an integer than $M$, then the two beams travelling at an angle $\theta$ will now cancel each other rather than reinforce, thereby producing no illumination. This relationship of the beams travelling at an angle to the axail beams of the light source is primarily responsible for the upper limit on the angular dimension or radius of the aperture 14$^a$ for the diaphragm 14 whether it is considered as shown in FIG. 2, or its equivalent, the diaphragm 18 in the Michelson interferometer. In actual practice it has been found that to obtain good visibility the radius should even be less than this limit to partially compensate for inequalities in amplitudes of the two beams reflected from the elements 11 and 12 and to complications of polarization effects occurring in the light dividing element 10.

It will be recalled, also, that in the Michelson type of interferometer, if the diaphragm 18 is removed, a circular fringe system will be produced at the focal plane of the collector lens 16. Under these operating conditions, as the path difference $t$ changes, the fringes close in or open out (appear similar to Newton's rings) but there will be no variation of the total flux of light at this focal plane. The placing of the diaphragm 18 in this focal plane with an aperture 18$^a$ somewhat smaller than the central disc or area of the interference pattern will provide the desired change in total light flux with changes in path differences.

The size of the aperture 14$^a$ or 18$^a$ has limited the amount of light flux available in order to obtain a predetermined ratio of maximum and minimum light flux for measuring purposes and accordingly has limited the use of the interferometer, heretofore, to measuring small path differences.

The present invention contemplates the use of an adjustable diaphragm system in place of the single pinhole aperture in the conventional Twyman-Green interferometer for increasing the total light flux that is available for measuring purposes beyond the light flux available when only the central disc of a conventional diaphragm is utilized. The adjustable diaphragm system is defined to provide a multi-ring light image proportioned relative to the path difference in the interferometer. The thus produced increase in total light flux provides an improved signal-to-noise ratio and is particularly useful for counting fringes with a photocell detector. This arrangement alone allows somewhat larger path differences to be measured than would be possible with brighter sources employed in conventional arrangements. However, when larger path differences, up to approximately eighteen inches are to be measured, some means has to be provided to monochromatize the light.

For the present, the invention will be considered in conjunction with the adjustable diaphragm system without utilizing the arrangement for monochromatizing the light, and which latter arrangement will be discussed immediately hereinafter.

Figure 4:
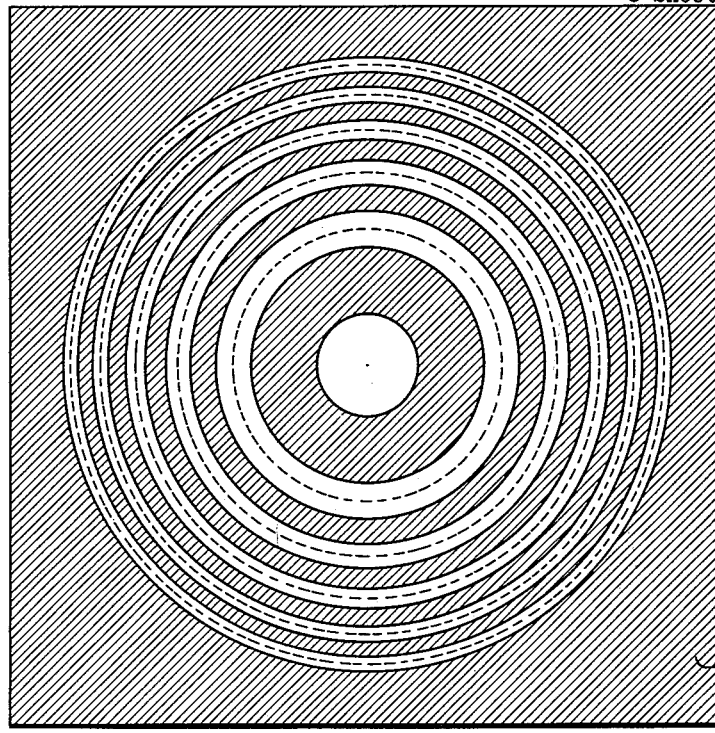
FIG. 4 is a front elevational view of a portion of the diaphragm for use in the arrangement of FIG. 5.
Figure 3:
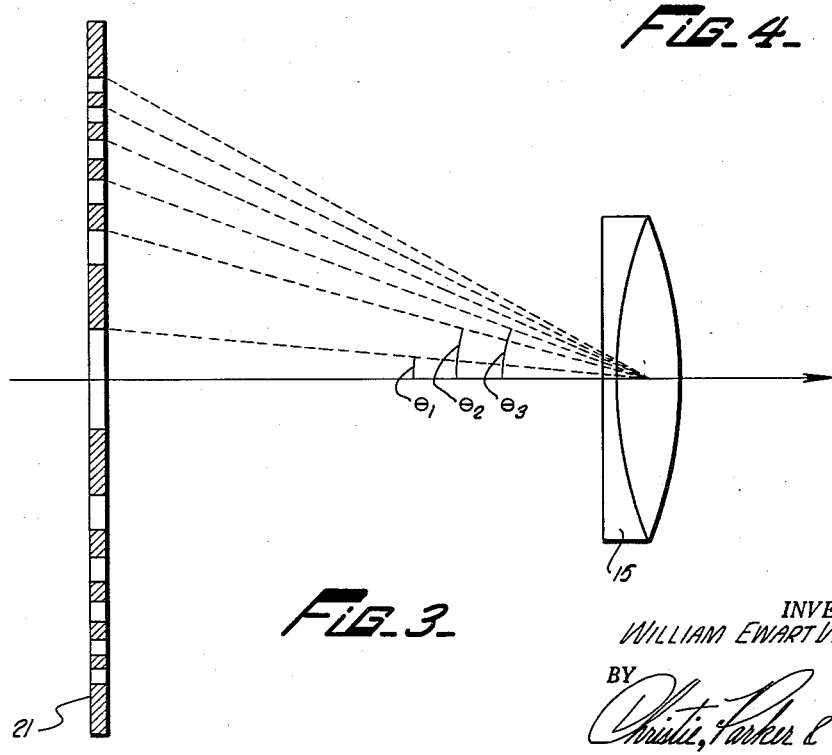
FIG. 3 is a diagrammatic representation of the diaphragm showing the opaque and light transmitting portions thereof as utilized in FIG. 4.

The fixed multi-ring plate that is employed in the adjustable diaphragm system has light transmitting rings that are concentric with a central light transmitting disc and have light radii that are related to the multiples of the wave length of the light source that cause the beams to reinforce. The radii of these outer concentric rings are defined by the radial limiting angles $\theta_2$, $\theta_3$, $\theta_4$, et cetera, which are related by one-half of a wave length to the light transmitting rings and cause the light beams to cancel. A diaphragm 21 of this type is shown in FIGS. 3 and 4 with only five concentric bright rings. As indicated hereinabove, the angle $\theta_1$, which causes the light beams that travel at this angle to cancel, governs the radius of the central disc. This radius may be also expressed as $m(1-\cosine \theta_1)=\frac{1}{2}$, and the second and third dark rings that correspond to the angles $\theta_2$ and $\theta_3$ as shown in FIG. 5 are given by the expressions $m(1-\cosine \theta_2)=\frac{3}{2}$ and $m(1-\cosine \theta_3)=\frac{5}{2}$, or the $n$th dark ring may be generally defined by $$m(1-\cosine \theta_n) = \frac{2n-1}{2}$$

wherein $n$ represents the number of the ring from the central disc. Therefore, the relationship of the angles $\theta_1$, $\theta_2$, et cetera in terms of the inner radius of these dark rings or rings of minimum light flux, may be reduced to read as follows:

$$\theta_1 : \theta_2 : \theta_3 : \theta_n : \frac{1}{\sqrt{m}} : \sqrt{\frac{3}{m}} : \sqrt{\frac{5}{m}} : \sqrt{\frac{2n+1}{m}}$$

The radii of the centers of the light transmitting rings or rings corresponding to the maximum intensity boundaries are defined in the ratio of the square roots of the numbers 2, 4, 6, . . . $2_n$, and their widths are defined as some predetermined fraction of the angular width between the zones of dark rings which have the above-defined radii. Stated differently, the areas of the bright rings are selected to correspond to the central portions of the bright rings of the corresponding rings in the actual fringe system and which fringe envelopes are much wider and have boundaries between the bright and dark rings that are very fuzzy or poorly defined.

The areas enclosed by these minimum intensity boundaries are thus proportional to 1:3:5: . . . $2^{n-1}$ since the areas are dependent on $\pi r^2$, wherein $r$ is the radius. With this formula in mind, the light flux contained in each outer ring can be seen to be twice the light flux available relative to the light flux provided when the central disc alone is used. If the area of the central disc and the corresponding light flux is considered to be one, it can be shown that the outer rings having the above radii will each have a light flux or area of two.

This plate must then be employed with the variable focal length system 22 to provide a real image of the light transmitting rings with a magnification dependent on the instantaneous path difference between the beams in the subsequent two-beam interferometer. This variable focal length system 22 must be constructed so that there is no change in the position or plane of the image of the diaphragm 21 to be used in the measuring interferometer but provide merely a change in the size of the image. This change in magnification or image size has to be proportional to the square root of the optical path difference between the two reflecting elements 11 and 12 of the two-beam interferometer.

The image of the diaphragm 21 is focused on an entrance diaphragm 14 for the interferometer proper. The size of the image of the diaphragm 21 is controlled by the variable focal length system 22 and the amount of light that is transmitted through the diaphragm 14 is dependent upon this image as well as the size of the fixed central aperture $14^a$. It is not necessary to provide a variable focal length for the system 22 to cover an extended magnification range. When the path differences approach zero, the magnification needed would theoretically approach infinity. However, all the magnification that is required is a magnification sufficient to magnify the central disc of the diaphragm 21 to the diameter of the aperture $14^a$ and which is set by the minimal size of the outermost bright ring when the path differences are at a maximum. For example, if the outer ring is the fifth ring under maximum path difference, the image will be reduced in size whereby the fifth ring just passes through the aperture $14^a$.

This variable image size can be conveniently achieved by employing two variable power zoom-type lens systems arranged front-to-front. If the ratio of magnification of one lens system is to be considered to be $m$ when the two systems are used in tandem as shown in FIG. 5, a variation extending over $m^2$ can be obtained to thereby provide the necessary light images.

This adjustable lens system may then be employed in the interferometer of the type shown and described in connection with FIG. 2 and is shown in such a combination in FIG. 5. The elements which are identified by the same reference numerals in both FIGS. 2 and 5 refer to the same element. The observing or recording means 17 is shown as comprising a photocell for actuating an electronic counter for the usual fringe counting operation. The movable light reflecting element 11 may be driven by any suitable driving means 20, in any direction or rate, and is coupled to the variable focal lens system 22 to control the size of the image of the diaphragm 21 in accordance with the increase and decrease of the path differences between the elements 11 and 12. The image of the diaphragm 21 that is transmitted to the measuring portion of the interferometer and thereby the amount of light flux is controlled by the size of the aperture $14^a$ provided for the diaphragm 14. To this end, the aperture $14^a$ is defined relative to the central light transmitting disc of the diaphragm 21 such that when the path lengths in the interferometer are the same the aperture $14^a$ merely transmits a portion of the central disc of the diaphragm 21. At the other extreme, when the path differences are a maximum, the image of the diaphragm 21 will have been reduced to a size whereby the outer ring or ring of largest radius will just pass through the aperture $14^a$. Within these extreme limits, the image of the diaphragm 21 will be varied whereby a different number of bright rings will be transmitted to the interferometer proper, or measuring portion, by means of the variable focal length system 22 in the correct inverse relationship. In this fashion the amount of light flux reaching the photocell will be increased thereby allowing the fringes to be counted at much higher rates than heretofore thought possible. This arrangement will measure path differences up to about four inches, for example.

The improvement in the signal-to-noise ratio may be expressed as $(2n+1)$ wherein $n$ is the maximum number of bright rings that may be transmitted by the adjustable diaphragm system. This increase in total light flux or efficiency provided by this invention can be used either to obtain a faster counting rate, as discussed, or to reduce the intensity of the light source, such as a discharge lamp, thereby narrowing the spectral line source and increasing the visibility so that the photocell can be satisfactorily employed over appreciably longer path lengths.

One of the limitations on measuring large path differences, for example over four inches, has been related to controlling the monochromaticity of the light source. When path differences on the order of eighteen inches are to be measured, no known spectral light source (omitting atomic beams and Paschen Schuler hollow cathode sources cooled with liquid helium, i.e., operating near zero degrees Kelvin) is sufficiently narrow to yield satisfactory fringes at this path difference. Therefore, it would be necessary to artificially narrow the available spectral line for measuring purposes or, stated differently, to artificially increase its monochromaticity to allow such large path differences to be measured. To this end, the adjustable diaphragm system may be advantageously used in combination with a means for effectively monochromatizing the light to allow fringes to be electrically counted at a very high rate for these large path differences. The light monochromatizer is arranged between the light source 13 and the adjustable diaphragm system and which chromatizer includes a standard Fabry-Pérot étalon 23 and a light comparator 24.

The Fabry-Pérot étalon produces an interference pattern which coincides, in the main, with the fixed multi-ring diaphragm 21 required for increasing the total light flux in the two-beam, or measuring, interferometer, that is, the centers of the bright rings of this interference pattern fall on the radii that are proportional to the square root of 2, 4, 6, et cetera. The difference between the Fabry-Pérot étalon and the two-beam interferometer is that the instrumental half width of the Fabry-Pérot étalon (due to multi-reflections) may be one-twentieth, or less, of the inter-order distance, while in the two-beam instrument, however monochromatic the source may be, the half width is never less than half the inter-order distance.

To construct the diaphragm 21 for use with the monochromatizing arrangement, a photograph of a large scale drawing reduced so that the étalon gap used and the focal length of the lens 16 for the wave length chosen will cause the bright interference fringes of the étalon to coincide with the light transmitting portions of the annular rings on the diaphragm 21. In addition, the diaphragm 21 is provided with two small apertures 33 and 35 preferably arranged on opposite sides of the first bright or light transmitting ring and arranged in the adjacent dark or opaque rings. The positions and areas of these apertures 33 and 35, see FIG. 6, are chosen with reference to the degree of monochromaticity of the original source and the size of the gap of the étalon so that when the light flux transmitted by these two apertures are equal, the center of the spectral line fringe coincides with the center of the annular transparent ring.

The invention, including the monochromatizer, is shown in FIGS. 7 and 8. The Fabry-Pérot étalon is enclosed in a chamber 25 having plane windows 26 and 27 at opposite ends thereof. The windows 26 and 27 may be plane, parallel, wedge-shaped, or lenticular. The spacer unit separating the highly reflecting surfaces 28 and 29 is provided with an aperture so that the pressures within and outside the étalon are always equal. The elements 28 and 29 are suitably spaced apart to provide the desired constructive interference and to transmit the multi-ring pattern to the adjustable diaphragm system. The chamber 25 is further provided with a means for controlling the pressure of the gas enclosed therein and which means may comprise a conventional bellows 31 shown connected to the outer wall of the chamber 25 in a gas-tight relationship. The bellows 31 is arranged to be controlled by means of an error signal for controlling the average or centroid wave length transmitted to the two-beam interferometer and thereby the monochromaticity of the transmitted light, as will be discussed more fully hereinafter. The usual entrance diaphragm 14' and collimating lens 15' are arranged intermediate the source 13 and the window 26, while a collector lens 16' focuses the fringe pattern on the diaphragm 21.

It will be recalled that the concentric ring system comprises an alternate light and dark ring and the envelopes between a dark and a light ring are rather fuzzy or not clearly defined. To monochromatize the light transmitted to the interferometer proper, the diaphragm 21 has been defined merely to represent a predetermined central portion of the light rings, as discussed hereinabove. However, due to dimensional changes or refractive index changes of the air or gas between the elements of the étalon, the fringe pattern focused on the narrow annular rings of the diaphragm 21 will close in or open out so that the effective wave length transmitted by this diaphragm will change. Since this changing wave length source destroys the purpose of the interferometer, there is provided two light conducting elements on the dark side of the diaphragm 21 and in alignment with each of the apertures 33 and 35 for transmitting a very small portion of the light out of the path of the interferometer proper and by means of a right angled prism (not shown) to the light comparator 24. The light conducting element may be in the form of a fiber bundle, as discussed in the above-identified text by Strong. The light comparator 24 in a practical form may be a standard ratio recorder. The ratio recorder is a standard item that is used in spectography and generally includes a servo drive system for operating a pen. In this instance, the pen is omitted and the servo drive system thereof is utilized to drive the bellows 31. The conventional operation of the ratio recorder is to compare the light energy from a pair of signals and to provide an electrical control signal corresponding thereto to the drive means. The two light signals, in this instance, are provided by the fiber bundles and the control or error signal is utilized to vary the pressure of the gas in the chamber 25 in accordance with the error signal and thereby keep the light transmitted through the diaphragm 21 "on center."

The remainder of the interferometer proper is used for the actual measuring purposes and is the same as shown and described in connection with FIG. 5. The operation of the improved interferometer will now be described with particular reference to FIGS. 4 and 6. It will be assumed that the pressure of the gas enclosed within the chamber 25 has been adjusted whereby the central portion of the bright rings of the fringe pattern will be transmitted through the diaphragm 21 and thereby through the aperture 14 to the interferometer proper. At this time then the ratio recorder will be rendered inoperative since the total light flux transmitted thereto by means of the apertures 33 and 35 are substantially equal. More particularly, with reference to FIG. 9, the central band A of the fringe envelope will be transmitted through the interferometer proper and the shaded areas corresponding to the light transmitted through the apertures 33 and 35 will be substantially identical. Due to dimensional changes or refractive index changes of the gas or air between the reflecting elements 11 and 12, the central portion of the fringe envelope that is transmitted may be displaced "off center," and thereby cause the effective wavelength of the light to change. If it is assumed that the fringe envelope shifts to the right as shown in FIG. 9, the center of the light band that is transmitted will also shift to the right as shown in dotted outline. In addition, under these operating conditions, the total light flux transmitted by means of the apertures 33 and 35 also changes whereby the total light flux provided by the aperture 33 decreases and, at the same time, a total light flux provided by the aperture 35 increases. This change in the operation of the étalon and, in particular, differences in the two light fluxes transmitted to the ratio recorder causes the comparator to once again function and provide an electrical signal corresponding to this shift which will actuate the drive means and thereby the bellows 31 to change the pressure of the gas in the chamber 25 to cause the fringe envelope to shift to the left until the amount of light provided through the apertures 33 and 35 is equal once again.

By careful computation of the areas 33 and 35 and their spacing, it is possible to arrange that the narrow band A is centered about the true center of the original source, provided that we can assume that the line broadening is substantially symmetrical. It should now be evident that the wave length of the band A that is transmitted can be made as an artificial standard of wave length for the measuring interferometer.

In this fashion, a source such as the green line of $H_g 198$ can be monochromatized still further so that good interference fringes can be obtained over one meter path differences. If the Fabry Pérot étalon is constructed with coatings of different refractive index instead of being half silvered to provide the desired transmitting and reflecting properties, the absorption losses can be reduced considerably and the resulting fringes can be photoelectrically counted at a practically useful rate. Due to the many air-glass surfaces in the total system, the non-reflection coatings should be multi-layer to reduce the absorption losses at each of these surfaces to approximately 0.1 percent instead of one percent for the conventional non-reflecting coatings.

If helium gas is used in the Fabry-Pérot chamber 25, much larger changes of pressure are needed to maintain the fringe pattern size than when air is utilized and this will simplify the construction of the servo control therefor.

It should now be evident that this invention has advanced the state of the interferometer art whereby large path differences may be measured by means of the novel arrangements for increasing the amount of light flux available for counting the fringes and the arrangement for monochromatizing the light.

What is claimed is:

1. An interferometer comprising a source of light, a light dividing element, a pair of reflecting elements spaced about the dividing element to receive the separate light beams from the dividing element and reflect them back to the light dividing element for recombination, one of said elements being movable, means for moving said one reflecting element, means for receiving the recombined light beams, and light quantity modifying means including means for producing a multi-ring image of light from said source and means for receiving said image and transmitting to the light dividing element a portion thereof selected in response to movement of the movable light reflecting element, said light quantity modifying means being arranged intermediate said light source and said light dividing element and coupled to the means for moving the movable light reflecting element for varying the amount of light received by said light dividing element in proportion to the movements of the movable reflecting element.

2. An interferometer comprising a source of light, a light dividing element, a pair of reflecting elements spaced about the dividing element to receive the separate light beams from the dividing element and reflect them back to the light dividing element for recombination, one of said elements being movable, means for moving said one reflecting element, means for receiving the recombined light beams, light quantity modifying means including means for producing a multi-ring image of light from said source and means for receiving said image and transmitting to the light dividing element a portion thereof selected in response to movement of the movable light reflecting element, said light quantity modifying means being arranged intermediate said light source and said light dividing element and coupled to the means for moving the movable light reflecting element for varying the amount of light received by said light dividing element in proportion to the movements of the movable reflecting element, and means including means for sensing and comparing portions of the light flux transmitted to said light dividing element to control the effective wave length of the light impinging thereon.

3. An interferometer as defined in claim 2 wherein said last-mentioned means includes a Fabry-Pérot étalon.

4. An arrangement comprising an interferometer including a fixed and movable reflecting element, a substantially monochromatic source of light, a first diaphragm having a fixed aperture therethrough for transmitting the light from said source to said interferometer, a second diaphragm having a predetermined circular pattern recorded thereon in terms of opaque and light transmitting rings arranged intermediate said source and said first diaphragm, a zoom-type lens system mounted intermediate said diaphragms and adapted to be responsive to the movements of the movable reflecting element for producing at the aperture of the first diaphragm an image of said circular pattern of a size inversely proportional to the square root of the difference in path lengths of said interferometer, and means for driving said movable reflecting element and said zoom system in unison.

5. An arrangement as defined in claim 4 including a light dividing element in the interferometer wherein the second diaphragm is constructed with a light transmitting disc defined to have a radius relative to the wave length of the light from said source to cause the light rays to destructively interfere upon recombination by the light dividing element and the radius to the center of each light transmitting ring being defined to have a radius relative to a multiple of the wave length of the light from said source to cause the light rays to constructively interfere upon recombination.

6. An arrangement comprising a measuring interferometer including a controllable reflecting element, means for driving said reflecting element a substantially monochromatic source of light, means including a Fabry-Pérot étalon mounted in a gas-tight chamber arranged to receive the light beams from said source for controlling the effective monochromaticity thereof, means for controlling the pressure of the gas for said étalon, light quantity modifying means including means for receiving the light image from the étalon and for producing a multi-ring image of the received light and means coupled to the reflecting element driving means for receiving said multi-ring image and transmitting to the interferometer a preselected portion of the multi-ring image inversely related to the difference in path lengths of said measuring interferometer, the light quantity modifying means being operable in response to the reflecting element driving means for varying the quantity of light transmitted from the étalon to the measuring interferometer, and means for sensing portions of the light transmitted through said light quantity modifying means and comparing the light fluxes thereof for actuating said pressure controlling means in accordance therewith.

7. An interferometer comprising a light dividing element, a pair of reflecting elements spaced about the dividing element to receive the separate light beams from the dividing element and reflect them back to the dividing element for recombination, one of said reflecting elements is arranged to be moved, controllable means for moving said one reflecting element, means for receiving the recombined light beams, a monochromatic source of light, a gas-tight chamber mounting a pair of parallel spaced optically plane glass light dividing plates to receive the light beams from said source and to transmit the received light, means coupled to said chamber for controllably changing the pressure of the gas in said chamber, a first optical diaphragm having concentric circular opaque portions arranged intermediate the gas-tight chamber and the dividing element for transmitting a circular light pattern corresponding to the central portions of the bright rings of the interference pattern produced by means of the light transmitted through said glass plates, a second diaphragm having a fixed central aperture therethrough disposed between the first diaphragm and the dividing element, light focusing means arranged between said diaphragms and coupled to said controllable means for receiving the circular light pattern and for producing at the second diaphragm aperture an image of the circular light pattern of a size inversely proportional to the square root of the path differences between said reflecting elements, means for sensing the light transmitted by means of said first diaphragm to determine the effective wave length thereof and to provide a control signal corresponding thereto, and means responsive to said control signal and connected to said pressure changing means for changing the pressure in said chamber.

8. An interferometer comprising a light source, a light dividing element, a pair of reflecting elements spaced about the dividing element to receive the separate light beams from the dividing element and reflect them back to the element for recombination, means for receiving the recombined light beams, a gas-tight chamber mounting a Fabry-Pérot type étalon having windows spaced to receive the light beams from said source and to transmit them by means of said étalon towards said light dividing element, means for controlling the pressure of a gas enclosed within said chamber, a first diaphragm arranged between the étalon and the light dividing element having a central light transmitting disc and a plurality of concentric light transmitting rings arranged around the disc and positioned to receive the light beams from said étalon and transmit them as a circularly ringed light pattern through the light transmitting portions towards said light dividing element, said diaphragm including a pair of light transmitting apertures arranged on opposite sides of one of the light transmitting rings thereof, means for receiving the light beams transmitted through said apertures and conducting same out of the path of the interferometer proper, means for receiving and comparing the total light flux transmitted through each of said apertures and providing an electrical control signal corresponding thereto, said means for controlling the pressure of the gas within said chamber being responsive to the electrical control signal for changing the gas pressure in accordance with said comparison, a variable focal length lens system arranged intermediate said diaphragm and said light dividing element, a second diaphragm having a central aperture arranged between the variable focal length lens system and the light dividing element an objective lens arranged to receive the light beams from the second diaphragm and focusing same on said light dividing element, one of said reflecting elements being movable, controllable means connected to said one reflecting element for driving same, said variable focal length system being connected to said controllable means to vary the focal length thereof with the changes in position of said one movable element, the variable focal length lens system receiving the circularly ringed light pattern and producing an image thereof at the second diaphragm aperture sized in proportion to the path differences between said reflecting elements thereby to vary the total light flux passing through said second diaphragm aperture to the light dividing element.

9. An interferometer comprising a light dividing element, a pair of light reflecting elements spaced about the dividing element to receive the separate light beams from the dividing element and reflect them back to the dividing element for recombination, one of said reflecting elements is arranged to be moved, means for receiving the recombined light beams, a monochromatic source of light, a gas-tight chamber mounting a Fabry-Pérot étalon to receive the light beams from said source, means coupled to said chamber for controllably changing the pressure of the gas in said chamber, a diaphragm having a central circular light transmitting portion arranged with alternate opaque and light transmitting rings for transmitting a circular light pattern corresponding to the central portions of the bright rings of the interference pattern produced by means of the light transmitted through said étalon, a controllable variable focal length lens system arranged adjacent said diaphragm and focused thereon to produce an image thereof of varying sizes, another diaphragm having a central aperture of a radius defined relative to the maximum path difference between said reflecting elements and the outer light transmitting ring of said first-mentioned diaphragm, means coupled to said movable reflecting element and said variable focal lens system for varying the movable element and providing an image of said first-mentioned diaphragm at the aperture for the second-mentioned diaphragm inversely proportional to the path differences between said reflecting elements, said first-mentioned diaphragm is further defined with a pair of light transmitting apertures of preselected dimensions arranged adjacent the opposite sides of a light transmitting ring in the adjacent opaque rings, a light transmitting fiber mounted in alignment with said apertures for separately transmitting the light passing through said apertures to a light comparator, means for comparing the thus transmitted light to determine the effective wave length thereof and to provide a control signal corresponding thereto, and means responsive to said control signal and connected to said pressure changing means for changing the pressure in said chamber to maintain the wave length of the light transmitted therethrough the same.

10. An interferometer comprising a light dividing element, a pair of light reflecting elements spaced about the dividing element to receive the separate light beams from the dividing element and reflect them back to the dividing element for recombination, one of said reflecting elements is arranged to be moved, means for receiving the recombined light beams, a monochromatic source of light, a gas-tight chamber mounting a pair of parallel spaced optically plane glass plates having partially reflecting-transmitting properties to receive the light rays from said source, means coupled to said chamber for controllably changing the pressure of the gas in said chamber, a diaphragm having a central circular light transmitting portion arranged with alternate opaque and light transmitting rings for transmitting a circular light pattern corresponding to the central portions of the bright rings of the interference pattern produced by means of the light transmitted through said glass plates, a controllable variable focal length lens system arranged adjacent said diaphragm and focused thereon to produce an image thereof of varying sizes, another diaphragm having a central aperture of a radius defined relative to the maximum path difference between said reflecting elements and the outer light transmitting rings of said first-mentioned diaphragm, means coupled to said movable reflecting element and said variable focal lens system for varying the movable element and providing an image of said first-mentioned diaphragm at the aperture for the second-mentioned diaphragm inversely proportional to the path differences between said reflecting elements, means for sensing the light transmitted by means of said first-mentioned diaphragm to determine the effective wave length thereof and to provide a control signal corresponding thereto, and means responsive to said control signal and connected to said pressure changing means for controlling same to change to the pressure in said chamber.

11. An interferometer as defined in claim 10 wherein said means for receiving the recombined light rays comprises a photoelectric element and an electronic counter coupled to receive the electrical impulses therefrom.

12. An interferometer as defined in claim 10 wherein said variable focal length lens system comprising a pair of zoom-type lens systems arranged front-to-front to provide an image of said diaphragm of a size inversely proportional to the square root of the path differences between said reflecting elements.

References Cited in the file of this patent

UNITED STATES PATENTS 1,709,809   Rashevsky _____ Apr. 16, 1929